US010685655B2

(12) United States Patent
Ginsberg et al.

(10) Patent No.: US 10,685,655 B2
(45) Date of Patent: Jun. 16, 2020

(54) LEVERAGING NATURAL LANGUAGE PROCESSING

(71) Applicant: International Business Machines Corporation, Armonk, NY (US)

(72) Inventors: Allen Ginsberg, St. Petersburg, FL (US); Charles E. Beller, Baltimore, MD (US); Chengmin Ding, Chantilly, VA (US); Elinna Shek, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 15/913,977

(22) Filed: Mar. 7, 2018

(65) Prior Publication Data

US 2019/0279639 A1 Sep. 12, 2019

(51) Int. Cl.
*G10L 15/24* (2013.01)
*G06N 5/02* (2006.01)
*G10L 15/10* (2006.01)
*G10L 15/12* (2006.01)
*G06F 40/35* (2020.01)
(Continued)

(52) U.S. Cl.
CPC .............. *G10L 15/24* (2013.01); *G06F 40/35* (2020.01); *G06N 5/02* (2013.01); *G10L 15/10* (2013.01); *G10L 15/12* (2013.01); *G10L 15/22* (2013.01); *G10L 25/48* (2013.01)

(58) Field of Classification Search
CPC ......... G10L 15/24; G10L 15/10; G10L 15/12; G06F 17/279; G06N 5/02
See application file for complete search history.

(56) References Cited

U.S. PATENT DOCUMENTS 6,314,398 B1 * 11/2001 Junqua ................ G10L 15/1822
348/E5.105
7,124,119 B2 10/2006 Bigus et al.
(Continued)

OTHER PUBLICATIONS

Liu, Luyao, Applying Intelligence Amplification in Decision Making, University of Tewente, May 2016.
(Continued)

*Primary Examiner* — Mohammad K Islam
(74) *Attorney, Agent, or Firm* — Lieberman & Brandsdorfer, LLC

(57) ABSTRACT

A system, computer program product, and method are provided to automate a natural language processing system to facilitate an artificial intelligence platform defining a relationship between dialogue and post dialogue activity. Dialogue is detected and analyzed, including identification of key words and phrases within the dialogue. Post dialogue actions, including physical actuation of a hardware device and an associated temporal proximity of the action and the dialogue, are monitored. The hardware device receives an instruction from a processing unit that relates to the analyzed dialogue and the hardware device changes states and/or actuates another hardware device. The system constructs a hypothesis, i.e., a relationship from the identified key phrase drawn from the analyzed dialogue and the monitored post action dialogue. A dialogue tree containing identified terms and associated post dialogue actions is dynamically modified with one or more new identified terms and the associated post dialogue actions.

15 Claims, 8 Drawing Sheets

(51) Int. Cl.
  *G10L 15/22* (2006.01)
  *G10L 25/48* (2013.01)

(56) References Cited

U.S. PATENT DOCUMENTS

| | | |
|---|---|---|
| 7,305,345 B2 | 12/2007 | Bares et al. |
| 7,987,151 B2 | 7/2011 | Schott et al. |
| 9,020,129 B2 | 4/2015 | Busayapongchai |
| 9,124,697 B2 | 9/2015 | Scott et al. |
| 9,318,108 B2 | 4/2016 | Gruber et al. |
| 9,575,963 B2 * | 2/2017 | Pasupalak ............... G06F 17/27 |
| 2014/0019215 A1 | 1/2014 | Jung et al. |
| 2014/0330560 A1 * | 11/2014 | Venkatesha ............. G06F 21/32 |
| | | 704/235 |
| 2015/0220511 A1 * | 8/2015 | Yang ................... G06F 16/3344 |
| | | 704/9 |
| 2016/0057522 A1 * | 2/2016 | Choisel .................... H04R 1/08 |
| | | 381/92 |
| 2016/0162464 A1 | 6/2016 | Munro et al. |
| 2016/0193732 A1 | 7/2016 | Breazeal et al. |
| 2016/0330295 A1 | 11/2016 | Chiappone et al. |
| 2017/0185758 A1 | 6/2017 | Oliker et al. |
| 2017/0200075 A1 | 7/2017 | Suskind et al. |
| 2017/0206899 A1 | 7/2017 | Bryant et al. |
| 2018/0068031 A1 * | 3/2018 | Hewavitharana ...... G06N 3/006 |
| 2018/0077146 A1 * | 3/2018 | Lonas ................. H04L 63/0823 |
| 2018/0107902 A1 * | 4/2018 | Yang ...................... G06K 9/623 |
| 2018/0308487 A1 * | 10/2018 | Goel ................... G10L 15/1815 |
| 2018/0349755 A1 * | 12/2018 | Gao ................... G06F 16/90332 |
| 2019/0042988 A1 * | 2/2019 | Brown ................... G06N 20/00 |

OTHER PUBLICATIONS

Baral, Chitta, et al., A High Level Language for Human Robot Interaction, Advances in Cognitive Systems 5 (2017) 1-6, pp. 1-16, May 2017.

Deits, Robin, et al., Clarifying Commands with Information—Theoretic Human-Robot Dialog, Journal of Human-Robot Interaction, vol. 2, No. 2, 2013, pp. 58-79.

Lauria, Stanislao, et al., Training Personal Robots Using Natural Language Instruction, IEEE Intelligent Systems, pp. 1-8, 2001.

Whetzel, Jon, Developing Intelligent Agents for Training Systems That Learn Their Strategies from Expert Player, Texas A&M University, Master of Science Thesis, pp. 1-105, Aug. 2005.

Venkatesh, Sandeep, et al., Agent Based Intelligent Alert System for Smart-Phones, Ramaiah Institute of Technology, Bangalore, India, pp. 1-4, Ma7 25, 2013.

Hancox, Peter, et al., An evaluation of keyword, string similarity and very shallow syntactic matching for a university admissions processing infobot, ComSIS vol. 10, No. 4, Special Issue, Oct. 2013, pp. 1703-1726.

* cited by examiner

LEVERAGING NATURAL LANGUAGE PROCESSING

BACKGROUND

The present embodiment(s) relate to natural language processing. More specifically, the embodiment(s) relate to an artificial intelligence platform to observe proximity of dialogue to post dialogue activity, and leverage the observation for application to a natural language processing (NLP) algorithm.

In the field of artificial intelligent computer systems, natural language systems (such as the IBM Watson™ artificial intelligent computer system and other natural language question answering systems) process natural language based on knowledge acquired by the system. To process natural language, the system may be trained with data derived from a database or corpus of knowledge.

Machine learning, which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

An intelligent agent, such as a call operator, is essentially driven from static structures, such as finite state machine models. These static structures dictate a determined output or action from that agent for given determinate inputs. This arrangement is satisfactory for most foreseen, unambiguous, and recognizable circumstances and conditions. However, unforeseen, ambiguous, and/or unrecognizable circumstances and conditions presented to such an agent will likely result in the agent routing the decision-making and action processes to a human counterpart that would be standing by to assist the agent. In such situations, the human counterpart will respond and resolve the issues presented. However, the agent will remain unable to respond to and resolve the associated or similar circumstances and conditions and will rely on the human counterpart indefinitely.

SUMMARY

The embodiments include a system, computer program product, and method for natural language processing directed at dialogue data and corresponding post dialogue data for cognitive systems.

In one aspect, a computer system is provided with a processing unit operatively coupled to a memory, and an artificial intelligence (AI) platform in communication with the processing unit and the memory. The AI platform includes a natural language processing (NLP) dialogue monitor to detect dialogue data and analyze the dialogue data responsive to the detection, including identification of a term within the dialogue data. The AI platform also includes a dialogue engine operatively coupled to the NLP monitor. The dialogue engine monitors a post dialogue action, including physical actuation of a hardware device and proximity of the actuation to the detected dialogue. The AI platform further includes an analysis engine operatively coupled to the dialogue engine and the NLP monitor. The analysis engine constructs a relationship from the identified key phrase drawn from the analyzed dialogue and the monitored post action dialogue. The AI platform also includes a search engine operatively coupled to the analysis engine. The search engine dynamically modifies a dialogue tree including addition of a new entry into the dialogue tree. The new entry including the identified term and the post dialogue action. The AI platform further includes a hardware device operatively coupled to the dialogue engine. The hardware device receives an instruction related to the analyzed dialogue data. The receipt of the instruction causes a physical action in the form of the hardware device to change states and/or actuation of a second hardware device.

In another aspect, a computer program product is provided to process natural language. The computer program product includes a computer readable storage device having program code that is executable by a processing unit. Program code is provided to leverage a natural language processing (NLP) dialogue monitor to detect dialogue data and analyze the dialogue data responsive to the detection, including identification of a term within the dialogue data. Program code is also provided to monitor a post dialogue action, including physical actuation of a hardware device and proximity of the actuation to the detected dialogue. Program code is further provided to construct a hypothesis from the identified key phrase drawn from the analyzed dialogue and the monitored post action dialogue. Program code is also provided to dynamically modify a dialogue tree including an addition of a new entry into the dialogue tree. The new entry includes the identified term and the post dialogue action. The product also includes a hardware device operatively coupled to the processing unit. The hardware device receives an instruction related to the analyzed dialogue data. Receipt of the instruction causes a physical action in the form of the hardware device to change states and/or actuation of a second hardware device.

In yet another aspect, a method is provided for processing natural language. The method includes detecting dialogue data and analyzing the dialogue data responsive to the detection, including identification of a term (keyword or phrase) within the dialogue data. The method also includes monitoring a post dialogue action, including physical actuation of a hardware device and proximity of the actuation to the detected dialogue. The method further includes constructing a hypothesis from the identified key phrase drawn from the analyzed dialogue and the monitored post action dialogue. The method also includes dynamically modifying a dialogue tree including addition of a new entry into the dialogue tree. The new entry includes the identified term and the post dialogue action. The method also includes a hardware device operatively coupled to the processing unit receiving an instruction related to the analyzed dialogue data. Receipt of the instruction causes a physical action, including the hardware device to change states and/or actuation of a second hardware device.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A dynamic structure is employed to replace or supplement a static structure, such as finite state machine model. The dynamic structure is utilized together with NLP and one or more learning algorithms to transform context into actuation of a physical hardware device. A structural framework is provided to organize information and concepts and associated physical transformations. In one embodiment, the framework may be in the form of a tree or knowledge graph (KG). Natural language processing (NLP) is utilized to monitor and detect dialogue, e.g. speech. The NLP uses algorithms to transform detected speech into dialogue data. In one embodiment, the dialogue data is in the form of words and/or phrases. The framework defines or otherwise associates dialogue data with one or more physical transformations. The dynamic characteristic of the framework supports amendment or modification of the structure to modify an existing entry of dialogue data. Similarly, the dynamic characteristic of the framework supports creation of a new entry, including new dialogue data and/or new physical transformation data. Modification of the framework enables and supports experiential learning base on observations and feedback. More specifically, the framework modification expands the functionality of the NLP and associated learning algorithm(s). In one embodiment, the framework modification expands the repertoire of functionality available to an automated agent through NLP and learning algorithm(s). Accordingly, the framework maintains relationships between dialogue data and one or more dynamic and progressive physical transformations.

Figure 1:
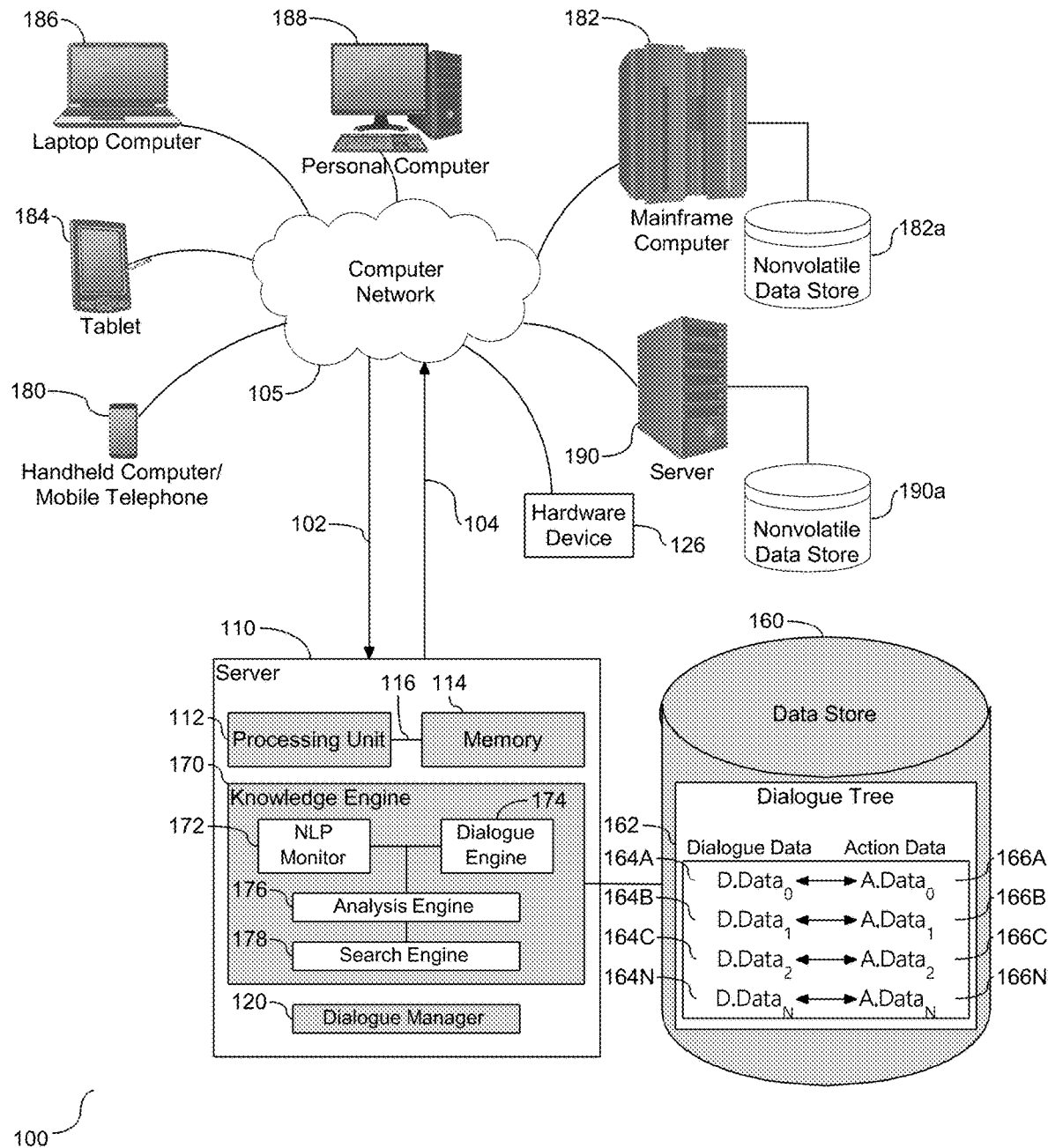
FIG. 1 depicts a system diagram illustrating a schematic diagram of a natural language process system.

Referring to FIG. 1, a schematic diagram of a natural language processing system (100) is depicted. As shown, a server (110) is provided in communication with a plurality of computing devices (180), (182), (184), (186), and (188) across a network connection (105). The server (110) is configured with a processing unit (112) operatively coupled to memory (114) across a bus (116). A tool in the form of a knowledge engine (170) is shown local to the server (110), and operatively coupled to the processing unit (112) and/or memory (114). As shown, the knowledge engine (170) contains one or more tools (172)-(178). The tools (172)-(178) provide natural language processing over the network (105) from one or more computing devices (180), (182), (184), (186) and (188). More specifically, the computing devices (180), (182), (184), (186), and (188) communicate with each other and with other devices or components via one or more wires and/or wireless data communication links, where each communication link may comprise one or more of wires, routers, switches, transmitters, receivers, or the like. In this networked arrangement, the server (110) and the network connection (105) may enable natural language processing and resolution for one or more content users. Other embodiments of the server (110) may be used with components, systems, sub-systems, and/or devices other than those that are depicted herein.

The tools, including the knowledge engine (170), or in one embodiment, the tools embedded therein including a NLP monitor (172), a dialogue engine (174), an analysis engine (176), and a search engine (178), may be configured to receive input from various sources, including but not limited to input from the network (105), one or more data structures shown herein as a dialogue tree (162) in a data store (160). In one embodiment, the dialogue tree (162) functions as a corpus of structured data. The dialogue tree (162) may be in the form of a node-graph. Regardless of the form, the dialogue tree (162) functions as a library of knowledge associating dialogue data with one or more physical transformation or actions. Although only one dialogue tree (162) is shown, in one embodiment, the data store (160) may include two or more dialogue trees. As such, the quantity of dialogue trees (162) shown herein should not be considered limiting. In an embodiment with the data store (160) having multiple dialogue trees (162), each dialogue tree (162) is a representation of an ontology of concepts. More specifically, each dialogue tree (162) represents or includes a plurality of related dialogue and physical transformation, e.g. physical actions. As shown, the dialogue tree (162) includes concepts shown herein as dialogue data $(164_A)$, $(164_B)$, $(164_C)$, ... $(164_N)$, with each data representation having an associated physical action $(166_A)$, $(166_B)$, $(166_C)$, ... $(166_N)$. In one embodiment, the physical action data identifies actuation of a physical device, and may be referred to herein as physical actuation data. The quantity of dialogue data and associated physical actions is merely representative and should not be considered limiting. In one embodiment, related dialogue trees are stored in an associated dialogue container, with the data store (160), also referred to herein as a corpus, storing one or more dialogue containers. In one embodiment, dialogue container may also be acquired from other sources, and as such, the data store depicted should not be considered limiting.

The various computing devices (180), (182), (184), (186), and (188) in communication with the network (105) demonstrate access points for content creators and content uses. Some of the computing devices may include devices for a database storing the corpus of data as a body of information used by the knowledge engine (170), and in one embodiment the tools (172)-(178), to embed deterministic behavior into the system. The network (105) may include local network connections and remote connections in various embodiments, such that the knowledge engine (170) and the embedded tools (172)-(178) may operate in environments of any size, including local and global, e.g. the Internet. Additionally, the server (110) and the knowledge engine (170) serves as a front-end system that can make available a variety of knowledge extracted from or represented in audio, dialogue, documents, network accessible sources and/or structured data sources. In this manner, some processes populate the server (110) with the server (110) also including input interfaces to receive requests and respond accordingly. Accordingly, the server (110) and the knowledge engine (170) serves as the front-end system, with the corpus (160) and the dialogue tree(s) (162) serving as the back-end system.

As shown, the corpus (160), which functions as a data store, is operatively coupled to the server (110). Content users may access the system via API administration or orchestration platforms, as shown and described in FIG. 2, and natural language input received via a NLU input path.

As described in detail below, the server (110) and the knowledge engine (170) processes natural language, including but not limited to statements, dialogue, queries, etc. In one embodiment, the knowledge engine (170) utilizes one or more machine learning models, hereinafter MLMs, to extract or store content in one or more dialogue tree(s) (162) stored in the data store (160). It is understood that in one embodiment the MLM is an algorithm employed or adapted to support the NLP. The MLMs extract entities and relationships from unstructured data. These models are specifically created to understand a particular domain of knowledge (e.g. biographical information, stock market, astronomy, etc.). The server (110) may be the IBM Watson™ system available from International Business Machines Corporation of Armonk, N.Y., which is augmented with the mechanisms of the illustrative embodiments described hereafter.

To process natural language, the server (110) utilizes an information handling system in the form of the knowledge engine (170) and associated tool (172)-(178) to support NLP. Though shown as being embodied in or integrated with the server (110), the information handling system may be implemented in a separate computing system (e.g., 190) that is connected across the network (105) to the server (110). Wherever embodied, the tools (172)-(178) are utilized to manage and process data, and more specifically, to detect and identify natural language and create or utilize deterministic output. As shown, the tools include an NLP dialogue monitor (172), a dialogue engine (174), an analysis engine (176) and a search engine (178). The knowledge engine (170) is shown operatively coupled to the data store (160), shown herein with one or more dialogue trees (162). Although shown local to the server (110), tools (172)-(178) may collectively or individually be embedded in memory (114).

Data, including dialogue data, is associated with a physical transformation and action, and the data together with the association is stored in in the dialogue tree (162) in the data store. The NLP monitor (172) functions to detect and analyze the dialogue data. More specifically, the NLP monitor identifies terms, such as words, phrases, entities, relationships, etc. Details of the functionality of the NLP monitor (172) are shown and described in FIG. 3.

The data detected and identified by the NLP monitor (172) is evaluated in relation to a physical action or other non-dialogue activity, such as, but not limited to, a physical transformation of a hardware device. The dialogue engine (174), which is shown operatively coupled to the NLP monitor (172), functions to detect or identified physical activity, such as, but not limited to, physical actuation of a hardware device, state transformation within or otherwise associated with a hardware device, etc. In one embodiment, the NLP monitor (172) functions to identify one or more nouns, and the dialogue engine (174) functions to identify one or more verbs and their proximity or relationship to the identified noun(s). The operative coupling of the NLP monitor (172) with the dialogue engine (174) is to enable the proximity of the tools and the data which they collect to be evaluated with respect to one another. Details of the proximity of the gathered data and their relationship is shown and described in FIG. 4. Accordingly, the NLP monitor (172) and the dialogue engine (174) function to gather different classes of proximal data.

As further shown, the knowledge engine (170) includes an analysis engine (176) that is operatively coupled to both the NLP monitor (172) and the dialogue engine (174). The analysis engine (176) functions to identify both categories of the data, including dialogue data and physical actuation data, and to construct a relationship between the two forms of data. For example, in one embodiment, the physical action data may precede the dialogue data, or in one embodiment, may take place after the dialogue data. Regardless of the order of the data, e.g. dialogue prior to action or action subsequent to dialog, the analysis engine (176) functions to construct a hypothesis of any relationship between the physical action or activity and proximally detected data. For example, in one embodiment, the analysis engine may identify a specific word within the dialogue as a key component in relation to the action. Details of the functionality of the analysis engine (176) are shown and described in FIG. 5.

The detected dialogue and associated physical action(s) are employed in a dynamic manner to transform the dialogue tree(s) (162), and the data stored therein, from a static structure to a dynamic structure. As shown, a search engine (178), which is operatively coupled to the analysis engine (176), functions to add the dynamic characteristics to the dialogue tree(s) (162). As the analysis engine (176) determines a relationship between or among the gathered data, the search engine (178) functions to dynamically add the relationship to the dialogue tree(s) (162). In one embodiment, the search engine (178) evaluates the entries in the dialogue tree(s) (162) to ascertain if the data together with the relationship is already present within the structure. Repeated use of the dialogue data and physical actuation data may add value, e.g. weighted value, to the relationship. Similarly, in one embodiment, the search engine (178) may submit a query to the dialogue tree(s) (162) with either the dialogue data or the physical actuation data. For example, the submission of the dialogue data to the dialogue tree(s) may produce an entry with an associated physical actuation. Details of the functionality of the search engine are shown and described in FIG. 6. Accordingly, the search engine (178) functions as a usage agent of the dialogue tree(s) to utilize the form and function of the dialogue tree(s) into predictive behavior.

The dialogue tree(s) (162) is a dynamic structure that may be modified in various manners. Such modifications include, but are not limited to, entry of a new data set and associated relationship, addition of a weight component to a data set entry, modification of an existing weight component a data set entry, etc. In one embodiment, the dialogue tree(s) (162) is a structured ontology and does not merely store data. The knowledge engine (170), together with the embedded tools (172)-(178), extracts data and one or more data relationships from unstructured data, creates an entry for the extracted data and data relationship(s) in dialogue tree(s) (162), and stores the data and data relationship(s) in the dialogue tree(s) (162). In one embodiment, data in the dialogue tree(s) (162) is stored or represented in a node and a relationship between two data elements is represented as an edge connecting two nodes. Similarly, in one embodiment, a weight is applied to the edge, with the weight representing the strength of the relationship of the two inter-connected nodes. For example, repeated detection of the data and data relationship is assigned a weight with an increased value in comparison to a data entry and data relationship value that is not duplicative or has not been previously entered into the dialogue tree(s) (162). Accordingly, the assigned or created weight is stored in the dialogue tree(s) as a factor of a defined edge, and reflects repeated detection and/or usage of the dialogue data and associated action.

It is understood that the dialogue tree (162) organizes and provides structure to gathered data, and in one embodiment, may increase in size to reflect large quantities of data. A dialogue tree (162) may be a single entity, or in one embodiment, dialogue container may be employed to comprise a plurality of dialogue trees (162) that are linked together to demonstrate their relationship or association. A dialogue manager (120), which is shown operatively coupled to the server (110), functions to manage structure and organization of the dialogue tree(s) (162). For example, a large dialogue tree (162) may be too cumbersome or expensive to manage. In this scenario, the dialogue manager (120) may partition the dialogue tree, effectively creating at least two partitions, e.g. a first dialogue partition and a second dialogue partition. The dialogue tree (162) may be partitioned based on one or more factors. For example, in one embodiment, the dialogue tree may be partitioned by topics or sub-topics. Similarly, each data relationship represented in the dialogue tree includes a physical actuation entry directly or indirectly associated with a physical hardware device. In one embodiment, the dialogue tree (162) may be partitioned by identification of the physical hardware device, e.g. device identifier. It is understood that the data relationships and associated weights are dynamic and may change over time, and as such, this change is reflected or embodied with the associated data. Accordingly, the dialogue manager (120) functions to manage data and provide structure and value to the data.

One of the functions of the dialogue manager (120) is to link or join two or more dialogue trees (162). Joining or linking dialogue trees is the inverse of partitioning a dialogue tree. The functionality of joining or linking dialogue trees requires the dialogue manager (120) to compare one or more data elements in one dialogue tree with one or more data elements in a second dialogue and to eliminate or at least reduce the appearance of duplicate data. As articulated above, in one embodiment each entry represented in the dialogue tree has at least two data components and an associated composite score represented as a weight. The dialogue manager (120) may use one data component, both data components, and/or the weight as a factor for the data comparison and evaluation. Once joined or linked, it may be feasible or warranted to remove duplicate data items. Data in linked dialogue trees determined to be duplicate data is selectively removed by the dialogue manager (120). One characteristic of removing duplicate data is the ability to maintain a manageable structure of the dialogue tree and to employ the weight as a factor to replace duplicative data. Accordingly, the dialogue manager (120) functions to manage the structure of the dialogue tree(s) by managing the data represented therein.

The evaluation of the NL input is managed by the NLP dialogue monitor (172). In addition to detecting and evaluating speech, the NLP dialogue monitor (172) detects non-verbal data, including but not limited to, video, emotive audio, speech in a raised voice or tone, speech in a lower voice or tone, words accompanied by an expletive, etc. The detected non-verbal dialogue data is applied to one or more identified dialogue terms and/or post dialogue action. For example, the dialogue engine (174) may be utilized to communication with an identified hardware device (126), including an instruction to implement a state change or actuation of the hardware device (126) corresponding to detection of the dialogue and non-verbal data. The state change is identified and classified as a post dialogue action. In one embodiment, the post dialogue action is classified by the dialogue engine (174) based on the characteristic(s) of the physical transformation and/or actuation, and the dialogue engine (174) manages creation of a corresponding new entry and placement of the new entry in the dialogue tree(s) (162). For example, opening or closing a lock, changing an operating state of an electrical appliance, connecting or disconnecting an Internet connection to an appliance, etc. The classification of the post dialogue action is associated with an entry of the detected non-verbal data in the dialogue tree(s) (162). The NLP monitor (172) creates an association between the identified state change and the post dialogue action, and in an embodiment, with detected non-verbal data, the NLP monitor (172) creates an association between the detected non-verbal data and the identified state change, and in one embodiment, the association includes the detected and identified dialogue terms. Similarly, in one embodiment, the NLP monitor (172) evaluates proximity of the identified verbal data, non-verbal data, and any post dialogue action, to the identified state change. Accordingly, the dialogue monitor (172) functions with the dialogue engine (174) to detect and classify verbal and non-verbal data, together with the proximity of the data to the hardware device state change.

It is understood that dialogue and associated physical transformations may take place on a repeated basis, and in one embodiment, on a frequent basis. For example, a physical device state change may be associated with a dialogue or subject of a dialogue at a set time on a daily basis. The analysis engine (176) is configured to evaluate re-occurrence of dialogue and/or hardware state change. The detected dialogue may be the same, or in one embodiment, one or more select words and/or phrases in the detected dialogue may be repetitive. The analysis engine (176) applies a weight to words and/or phrases that are detected within the dialogue data as repeated in at least two sets of dialogues.

The weight reflects prominence of the detected words and/or phrases as it is associated with the physical device state change. In one embodiment, the weight is assigned to an edge between nodes of the dialogue tree(s) (162). At the same time, application of the weight reflects a dynamic modification of the dialogue tree(s) (162), as well as a confirmation an association between the detected words and/or phrases and the physical device state change. A single association presented in the dialogue tree has a lower weight than a repetition of the association that is assigned a higher weight value, and thereby mitigating duplicate entries in the dialogue tree(s) (162). Accordingly, application of the weight or an increase in the weight value as reflected in the dialogue tree(s) (162) is a characteristic directed at an enhanced association value.

Types of information handling systems that can utilize system (110) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include pen or tablet computer (184), laptop or notebook computer (186), personal computer system (188) and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems.

An information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
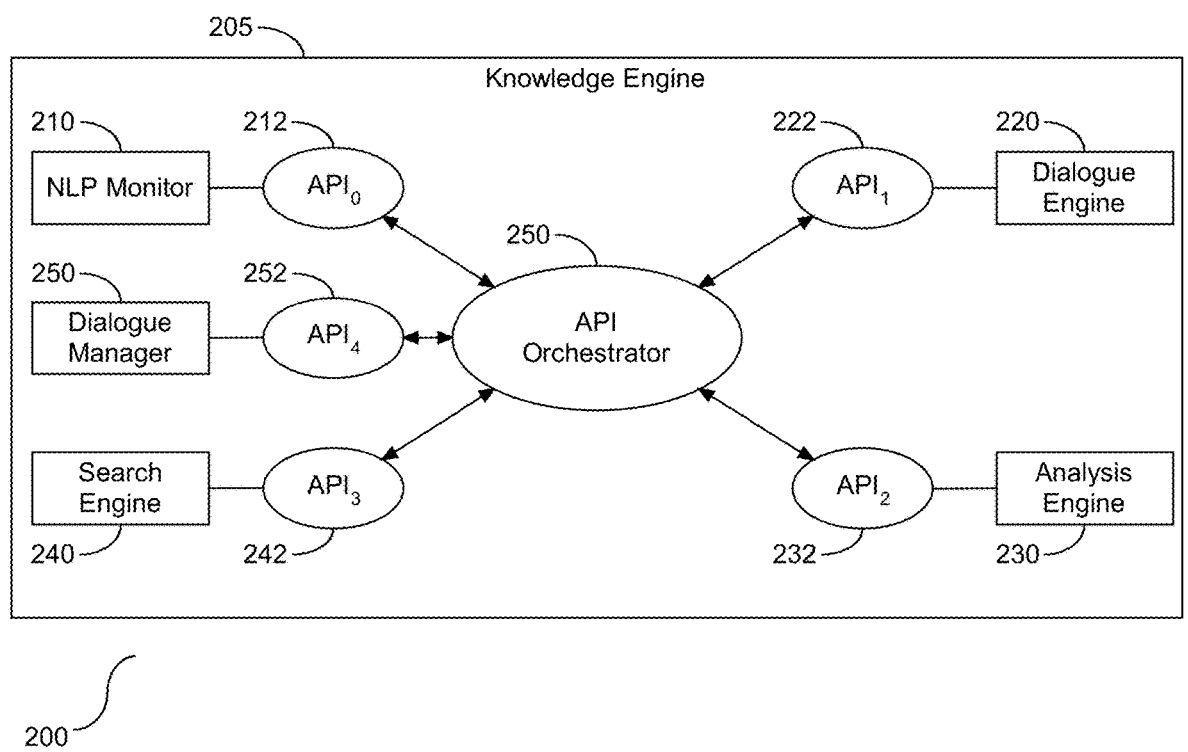
FIG. 2 depicts a block diagram a block diagram is provided illustrating the NL processing tools shown in FIG. 1 and their associated APIs.

An Application Program Interface (API) is understood in the art as a software intermediary between two or more applications. With respect NL processing system shown and described in FIG. 1, one or more APIs may be utilized to support one or more of the tools (172)-(178) and (120) and their associated functionality. Referring to FIG. 2, a block diagram (200) is provided illustrating the NL processing tools and their associated APIs. As shown, a plurality of tools are embedded within the knowledge engine (205), with the tools including the NLP monitor (210) associated with $API_0$ (212), the dialogue engine (220) associated with $API_1$ (222), the analysis engine (230) associated with $API_2$ (232), the search engine (240) associated with $API_3$ (242), and the dialogue manager (250) associated with $API_4$ (252). Each of the APIs may be implemented in one or more languages and interface specifications. $API_0$ (212) provides for detection of dialogue data; $API_1$ (222) provides monitoring and detecting post dialogue action activity; $API_2$ (232) provides construction of a hypothesis utilizing both the detected dialogue data and the detected post dialogue action activity; $API_3$ (242) provides for modification of an associated dialogue tree; and $API_4$ (252) provides for management of the structure and organization of the dialogue tree(s). As shown, each of the APIs (212), (222), (232), (242) and (252) are operatively coupled to an API orchestrator (260), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
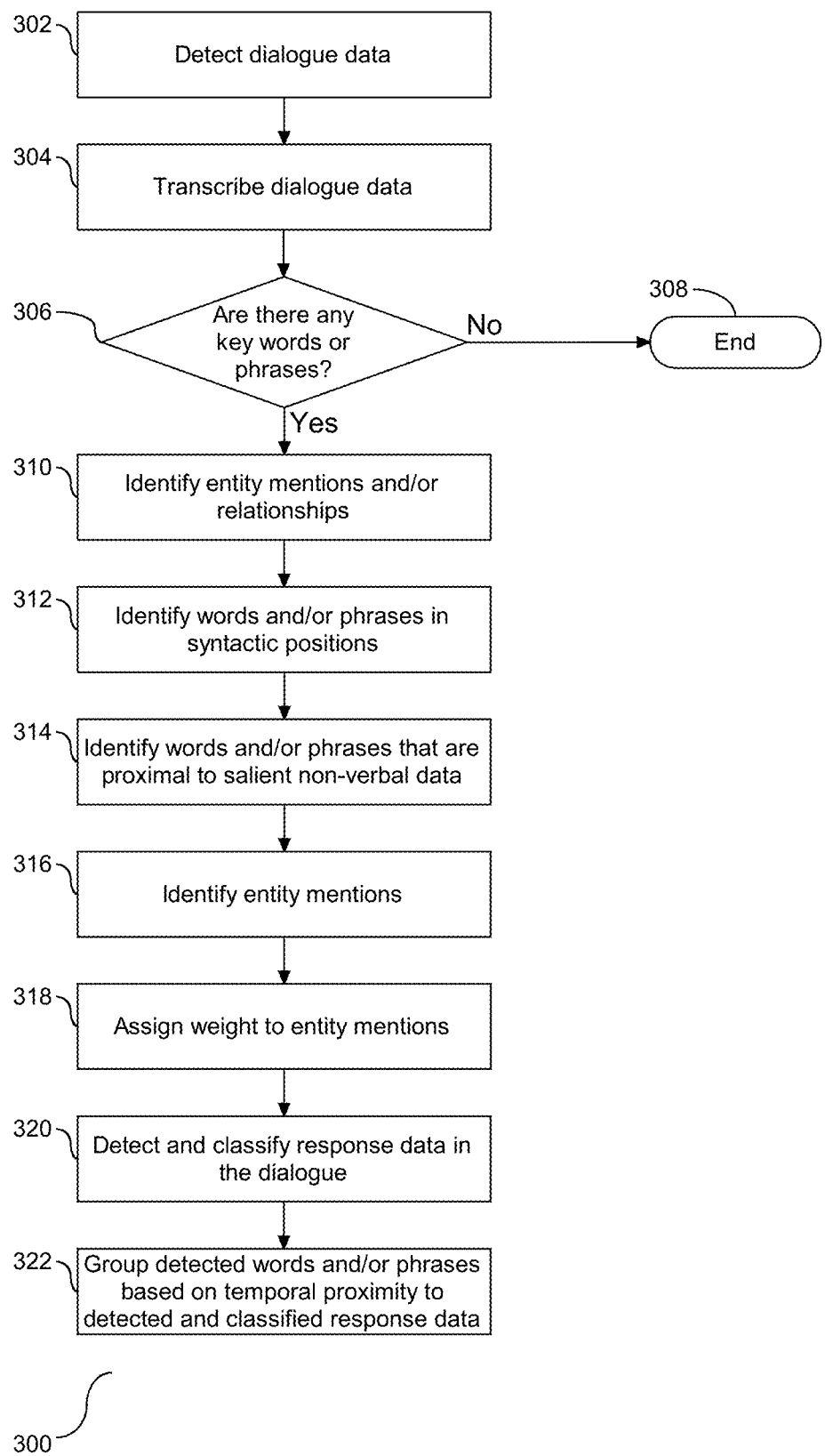
FIG. 3 depicts a flow chart illustrating a flow chart demonstrating the functionality of the NLP monitor.

To provide additional details for an improved understanding of selected embodiments of the present disclosure, reference is now made to FIG. 3 which illustrates a flow chart (300) demonstrating the functionality of the NLP monitor (172). Detection of dialogue data (302) includes verbal data and non-verbal data. Examples of non-verbal data include, but is not limited to, video, emotive audio, etc. The detected dialogue data is transcribed (304), and it is determined if there are any key terms of phrases present in the transcription (306). A negative response to the determination concludes the dialogue evaluation (308), and in one embodiment may be followed by a return to step (302) for evaluation of a subsequently detected dialogue. However, a positive response to the determination at step (306) is followed by utilizing the determined key term(s) and/or phrase(s) to identify entity mentions and/or important relationships (310), identify word(s) and/or phrase(s) that occur in prominent syntactic positions with the transcription (312), and identify word(s) and/or phrases that occur proximate to salient non-verbal data (314), such as shouted words. The identification at steps (310)-(314) are utilized for evaluation of the dialogue data. More specifically, following the identification, significant, e.g. unconventional, entity mentions in the detected dialogue data are identified (316) and assigning a weight (318). Accordingly, the NLP monitor functions to detected and parse dialogue data, including verbal and non-verbal data.

It is understood that dialogue is a verbal conversation between two or more parties. It is further understood that one of the parties in the dialogue is responding to input or inquiries from another party in the dialogue. Following step (318), the NLP monitor detects and classifies response data in the dialogue (320). Response data may be in the form of, but not limited to, an acknowledgement, request for additional information, denial of a request, acceptance of a request, etc. It is understood that one or more select words or phrases may yield similar or repeated responses, either in the same dialogue or multiple dialogues. For example, dialogue data associated with a help desk may identify specific dialogue data in the form of a request that is correlated with specific response data. Following step (320), detected words and/or phrases that have been identified by the NLP monitor are grouped based on their temporal proximity to the detected and classified response data (322). Accordingly, the NLP monitor functions to organize and classify words and/or phrases within the detected dialogue.

Figure 4:
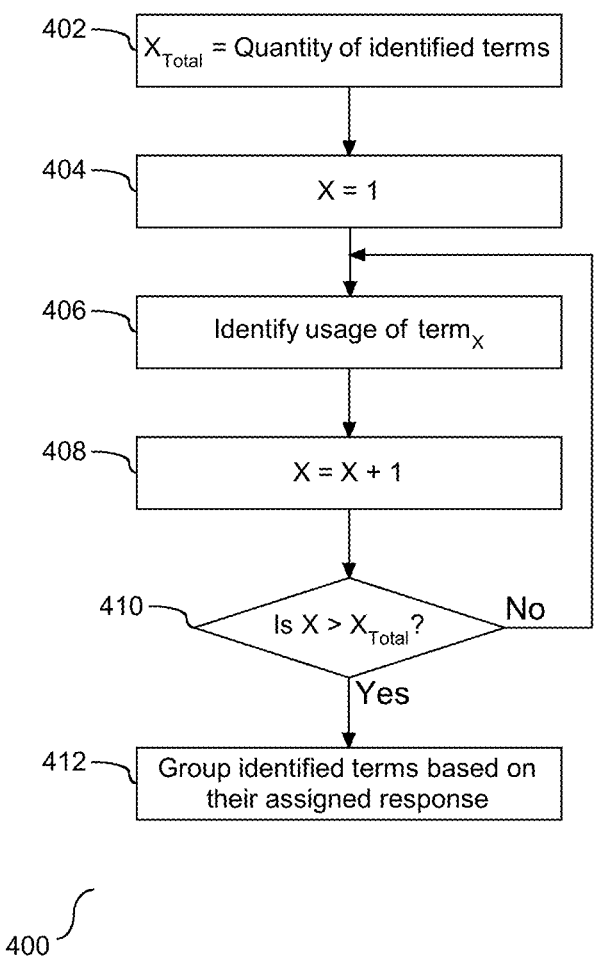
FIG. 4 depicts a flow chart illustrating a process for identifying proximity of the gathered data and their relationship.

Referring to FIG. 4, a flow chart (400) is provided illustrating a process for identifying the proximity of the gathered data and their relationship is shown and described in FIG. 4. It is understood that dialogue data is processed to identify word and/or phrases, including identification of grammatical form of the manner in which the identified words and/or phrases are employed. As shown and described in FIG. 3, one or more words, or phrases, hereinafter referred to as terms, is identified. The variable $X_{Total}$ is assigned to the quantity of identified terms (402), and an associated counting variable is initialized (404). Each term, $term_X$, has a corresponding usage within the dialogue that is being evaluated. For example, the term may be a noun, a verb, adverb, etc. The usage of $term_X$ is identified (406). It is understood that an action in some form takes place parallel to the dialogue, which in one embodiment may be a non-verbal action. Examples of such action includes, but is not limited to, raised decibel level of the response dialogue, lowered decibel level of the dialogue response, actuation of a hardware device, state change of a hardware device, etc. In one embodiment, a selection of responses is provided, and each term, $term_X$, is assigned to one of the responses available in the selection. Following step (406), the counting variable is incremented (408), followed by determining if each term has been evaluated (410). A negative response is followed by a return to step (408), and a positive response concludes the evaluation process. More specifically, following a positive response to the determination at step (410), the terms are grouped based on their assigned response (412). In one embodiment, the terms are placed in groups based on their temporal proximity to their assigned response. Accordingly, identified terms are evaluated and categorized based on corresponding non-verbal output and categorization of the output.

Figure 5:
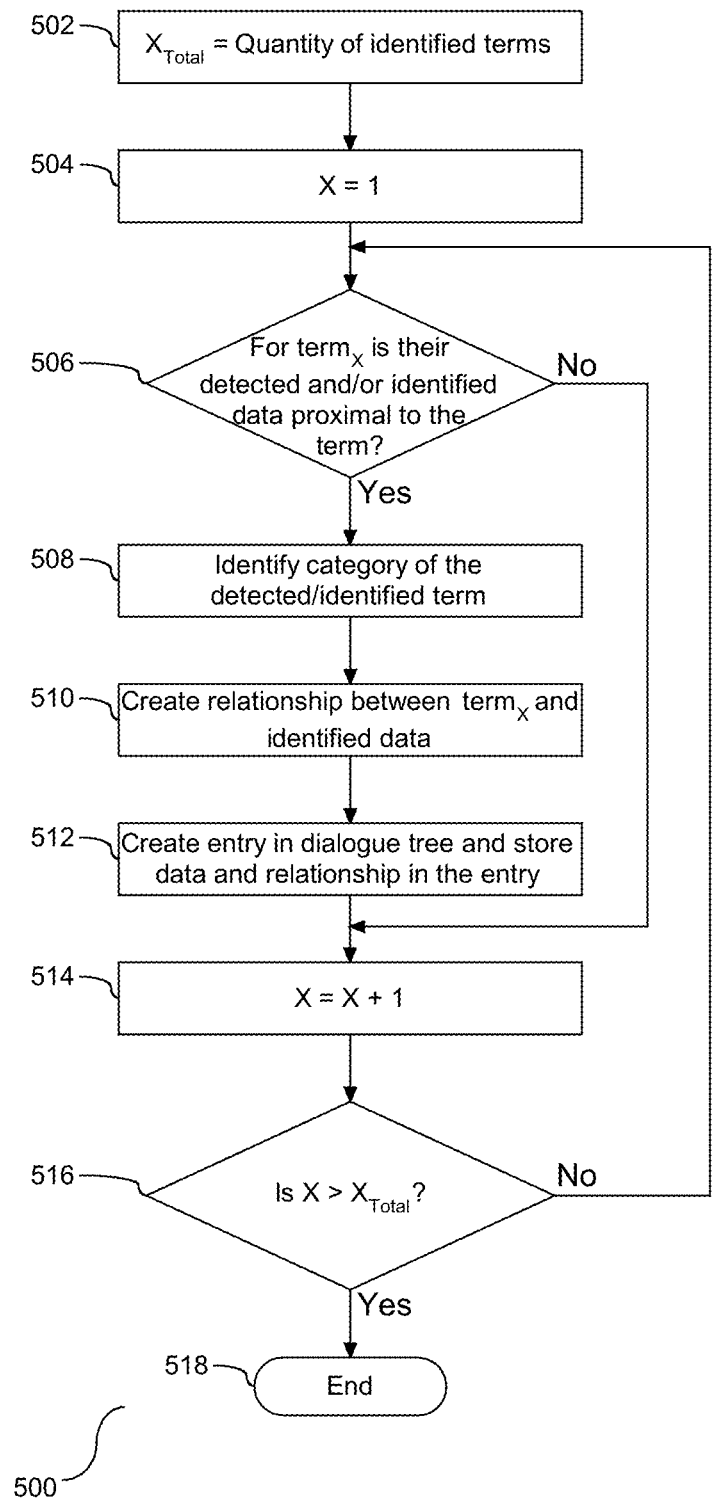
FIG. 5 depicts a flow chart illustrating a process for constructing a relationship between detected verbal and non-verbal data.

As shown in FIGS. 3 and 4, dialogue data is evaluated in view of context with respect to the dialogue, and in view of physical activity, e.g. non-dialogue data. It is understood the dialogue and non-dialogue activity data may related. Specifically, proximity of a physical device actuation of state change preceding or following the dialogue may be related to context within the associated verbal data. With reference to FIG. 5, a flow chart (500) is provided illustrating a process for constructing a relationship between detected verbal and non-verbal data. The variable $X_{Total}$ is assigned to the identified terms (502), and an associated term counting variable is initialized (504). For each $term_X$, it is assessed if there is any detected and/or identified data determined to be proximal to $term_X$ (506). In one embodiment, the proximity may be within a range, e.g. time interval, of the term, including prior or subsequent to the detected term, $term_X$. A positive response to the determination at step (506) is followed by identifying a category of the detected or identified data (508). More specifically, at step (508) is it determined if the category is verbal or non-verbal data. A relationship between $term_X$ and the detected or identified data is created (510), and in one embodiment, an entry for the relationship is created and stored in an associated dialogue tree (512). In one embodiment, post dialogue action is detected and classified, and stored with the entry in the dialogue tree. In one embodiment, the tree entry includes the term, the detected and identified data, and the associated category of the detected data. Accordingly, terms are evaluated as they correspond to associated detected data.

In one embodiment, there may be at least two data elements with at least one of the data elements being in a different category. For example, in one embodiment, actuation of a physical device may be detected, which is a non-verbal datum, and a corresponding shouted verbal response is also detected. Both of these data elements are identified, classified, and associated with $term_X$, and stored in the dialogue tree. It is understood that an assessed term, $term_X$, may not any corresponding activity that has been detected, as demonstrated by a negative response to the determination at step (506). Following a negative response to the determination at step (506) or following step (512), the term counting variable is incremented (514). It is then determined if each of the identified terms have been evaluated (516). A positive response to the determination at step (516) concludes the association and relationship creation process (518), and a negative response to the determination at step (516) is followed by a return to step (506). According, as demonstrated, the terms are individual assessed for proximally related verbal and non-verbal activity.

Figure 6:
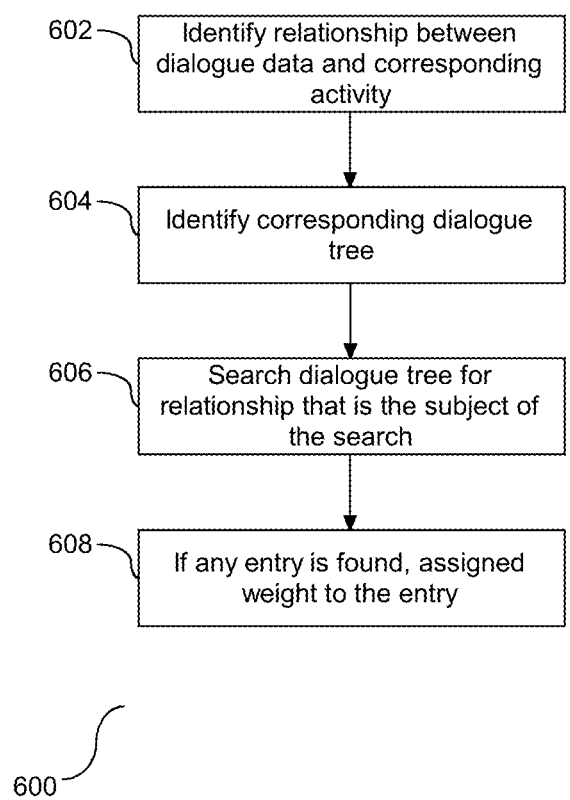
FIG. 6 depicts a flow chart illustrating a process for searching one or more dialogue trees to identify and document repeated behaviors and relationships.

As shown in FIG. 5, one or more entries are created and stored in the dialogue tree(s) (162). In one embodiment, each entry is a node in the tree structure, with an associated edge connecting related nodes. For example, in one embodiment, two inter-connected nodes may be dialogue data and physical data with the edge representing the relationship between the two nodes. It is understood that repeated use of one or more dialogue terms may be related to the same physical activity. Such repetition may be reflected by adding a weight to the corresponding edge. With reference to FIG. 6, a flow chart (600) is provided illustrating a process for searching one or more dialogue trees to identify and document repeated behaviors and relationships. As such, a relationship between the dialogue data and corresponding activity is identified (602). A corresponding dialogue tree is identified (604). In one embodiment, there may be more than one dialogue tree, and the search may require identification of a specific dialogue tree, or another embodiment, the search may be extended to more than one dialogue tree. Regardless of the quantity of dialogue trees subject to the search, the identified tree(s) is searched for relationship that is the subject of the search (606). If an entry for the relationship is found in the tree, then a weight is assigned to a tree entry (608). In one embodiment, the edge has a weight, and the value of the weight is modified, e.g. increased, to reflect the repeated use of the relationship. In another embodiment, a weight is a field in the corresponding node, and the weight value in the corresponding node is modified, e.g. increased, to reflect the repeated use of the relationship. Similarly, in one embodiment, the weight may be reflected in both the corresponding nodes and edge(s). Accordingly, the application of the weight to the tree node(s) and/or edge(s) entry in reflects a prominence of the relationship.

As shown and described, the assessed data is stored in a dialogue tree to support the AI aspect of learning from experience, and utilizing the knowledge for application to a future activity. For example, it is understood that some activities operate on a repeated schedule. With day of the week and time of the day identifying specific repeated actions. The NLP monitor may be utilized together with the other tools and the associated dialogue tree(s) to manage verbal requests that correlate to the repeated schedule. In one embodiment, the repeated schedule and associated requests are classified as normal operating procedures. The tools shown in FIG. 1, together with the associated processes and functionality shown in the flow charts of FIGS. 2-6, illustrate use of a computer implemented intelligent agent, e.g. knowledge engine, to conduct or facilitate interactions and routine processes.

Figure 7:
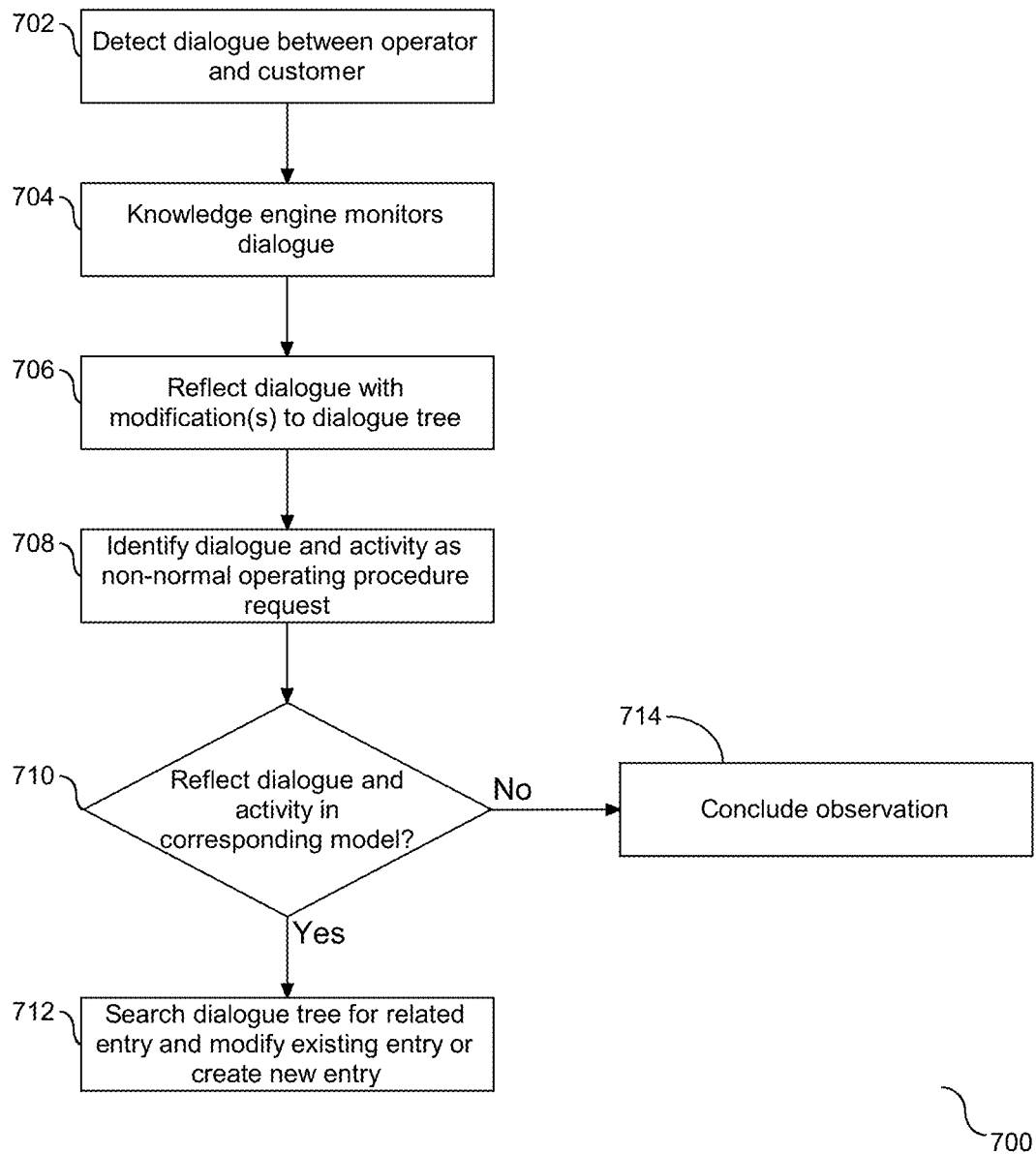
FIG. 7 depicts a flow chart illustrating a process for post-event interaction and selective modification of the dialogue tree(s).

The knowledge engine, may function parallel to a machine operator to observe operator dialogue, corresponding physical machine action(s), and creating entries in the dialogue tree(s) to document the observations. With reference to FIG. 7, a flow chart (700) is provided illustrating a process for post-event interaction and selective modification of the dialogue tree(s). As shown, a dialogue takes place between an operator and a customer (702). The knowledge engine monitors the dialogue (704), including parsing the terms and associated activity. Dialogue and associated activity determined to be part of a normal operating procedure is reflected with a modification of the dialogue tree(s) (706). In one embodiment, the modification is conducted in real-time. Dialogue and associated activity data may be identified as a non-normal operating procedure request (708). In this situation, a request is presented to the operator confirming if the dialogue and associated activity should be reflected in a corresponding action model, e.g. dialogue tree(s), (710). A positive response to the determination at step (710) is followed by searching a corresponding dialogue tree for a related entry, and modifying an existing entry or creating a new entry in the dialogue tree (712). In one embodiment, an amendment to the created or modified entry at step (712) may be created to identify or categorize if a repetition of the activity should be managed by the knowledge engine or the operator. Similarly, a negative response to the determination at step (710) is followed by concluding the observation (714). Accordingly, activity outside the normal operating procedure may be observed and recorded, and selectively identified for future management by the AI tools.

Figure 8:
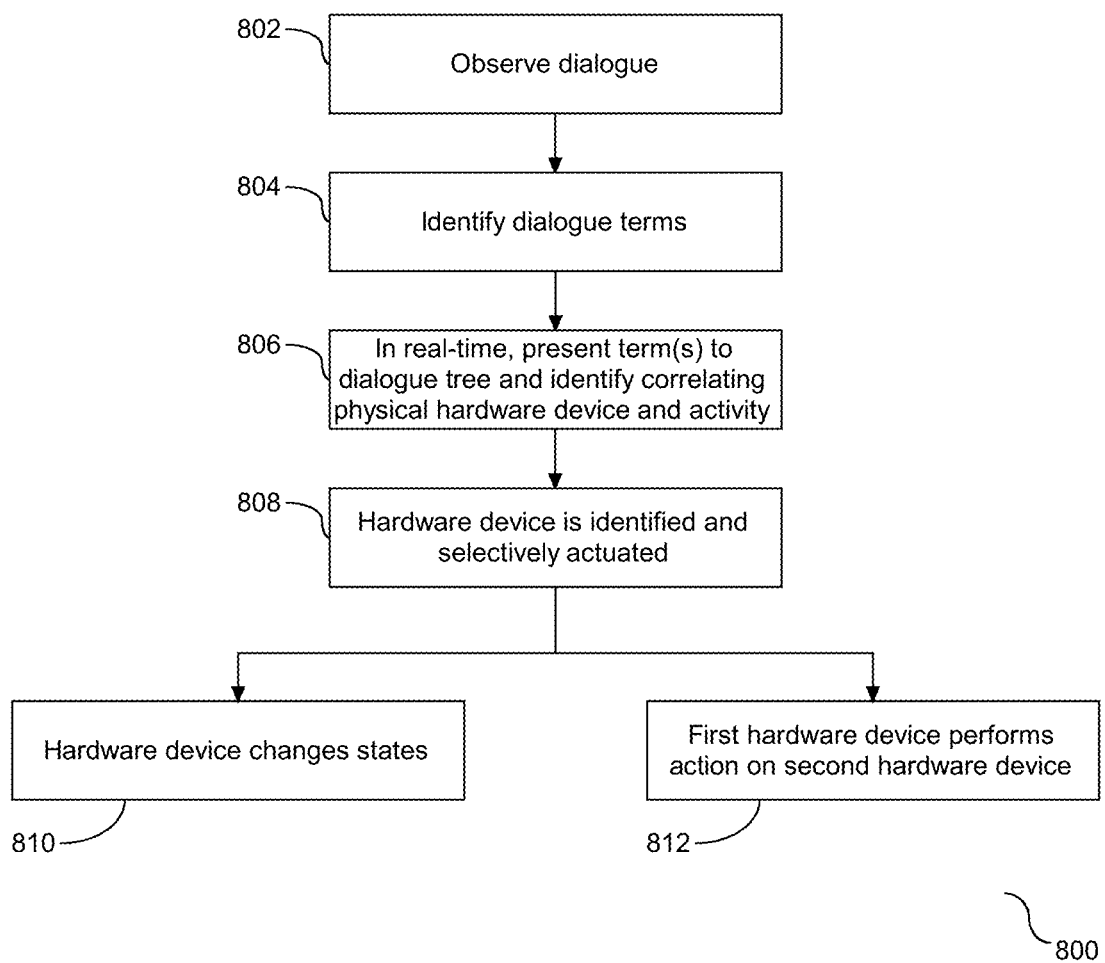
FIG. 8 depicts a flow chart illustrating a process for processing a dialogue in relation to a physical hardware device.

As shown and described in FIGS. 1-7, the identification and application of dialogue data to a physical activity may cause an associated machine, e.g. hardware device, to perform an action. Referring to FIG. 8, a flow chart (800) is provided illustrating a process for processing a dialogue in relation to a physical hardware device. As shown, a dialogue is observed (802) and one or more applicable terms in the dialogue are identified (804). The terms are presented to a dialogue tree in real-time to identify a correlating physical hardware device and an associated physical activity or transformation of the device (806). Based on the search results from the dialogue tree, as shown in FIG. 7, in one embodiment, a corresponding first hardware device is identified (808) and selectively actuated based on the association document in the dialogue tree. This actuation at step (808) may cause the first hardware device to change states (810), e.g. from a first state to a second state. Similarly, this actuation may result in the first hardware device to perform an action on a second hardware device (812). In this example, the first and second hardware devices are different and the corresponding actions are different. In one embodiment, the data in an identified node in the dialogue tree may be addressed to a physical device and identify a state of the device corresponding to the identified term(s) in the dialogue. Accordingly, as shown a physical intent from the dialogue data is converted into a physical manifestation that produces one or more physical transformations.

It is understood that business use case drives the interpretation of the dialogue data and relatively activity data. For example, identification of normal operating procedure and non-normal operating procedure activity may drive the automation of implementation of the physical activity. For example, a search of the dialogue tree that identifies an entry with a significant weight may be followed by the implementation of the identified physical activity in real-time with the system configured to automatically implement the physical activity.

The system and flow charts shown herein may also be in the form of a computer program device for use with an intelligent computer platform in order to facilitate NL processing. The device has program code embodied therewith. The program code is executable by a processing unit to support the described functionality.

As shown and described, in one embodiment, the processing unit supports functionality to search the dialogue tree(s), e.g. corpus, for evidence of one or more existing entries and corresponding physical activity. The edge and associated weight qualifies and/or quantifies the associated data. Similarly, as described herein, the dialogue tree(s) may be dynamically adjusted to reflect creation of new entries or modification of one or more new entities and entity relationships.

While particular embodiments have been shown and described, it will be obvious to those skilled in the art that, based upon the teachings herein, changes and modifications may be made without departing from its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of a machine learning model based on veracity values and leveraging BC technology.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) is described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the natural language processing may be carried out by different computing platforms or across multiple devices. Furthermore, the data storage and/or corpus may be localized, remote, or spread across multiple systems. Accordingly, the scope of protection of the embodiment(s) is limited only by the following claims and their equivalents.

What is claimed is:

1. A computer system comprising:
    a processing unit operatively coupled to memory;
    an artificial intelligence (AI) platform, in communication with the processing unit and memory, the AI platform comprising:
        a natural language processing (NLP) dialogue monitor to detect dialogue data and analyze the detected dialogue data, including identification of a term within the detected dialogue data;
        a dialogue engine operatively coupled to the NLP dialogue monitor, the dialogue engine to monitor a post dialogue action, including physical actuation of a hardware device and proximity of the actuation to the detected dialogue data;
        an analysis engine operatively coupled to the dialogue engine and the NLP dialogue monitor, the analysis engine to construct a relationship from an identified key phrase drawn from the analyzed dialogue data and the monitored post dialogue action;

the analysis engine to evaluate a re-occurrence of the identified term in a first dialogue and a second dialogue, and to apply a weight to the identified term, wherein the weight reflects prominence of the identified term; and a search engine, operatively coupled to the analysis engine, to dynamically modify a dialogue tree responsive to the applied weight, including addition of a new entry into the dialogue tree, the new entry including the identified term and the post dialogue action; and the hardware device operatively coupled to the dialogue engine, the hardware device to receive an instruction related to the analyzed dialogue data, wherein receipt of the instruction causes a physical action comprising the hardware device to change states, actuation of a second hardware device, or combinations thereof.

2. The system of claim 1, further comprising the dialogue engine to detect non-verbal data and apply the detected non-verbal data to the identified term and post dialogue action.

3. The system of claim 2, further comprising the NLP dialogue monitor to evaluate proximity of occurrence of the identified term to the detected non-verbal data.

4. The system of claim 2, further comprising the dialogue engine to detect a response to the post dialogue action, and to classify the detected response with the new entry in the dialogue tree.

5. The system of claim 1, wherein the dynamic modification of the dialogue tree is a confirmation of an association between the identified term and the post dialogue action.

6. A computer program product to process natural language (NL), the computer program product comprising a computer readable storage device having program code embodied therewith, the program code executable by a processing unit to:

leverage a natural language processing (NLP) dialogue monitor to detect dialogue data and analyze the detected dialogue data, including identification of a term within the detected dialogue data;

monitor a post dialogue action, including physical actuation of a hardware device and proximity of the actuation to the detected dialogue data;

construct a hypothesis from an identified key phrase drawn from the analyzed dialogue data and the monitored post dialogue action;

evaluate a re-occurrence of the identified term in a first dialogue and a second dialogue, and apply a weight to the identified term, wherein the weight reflects prominence of the identified term;

dynamically modify a dialogue tree responsive to the applied weight, including addition of a new entry into the dialogue tree, the new entry including the identified term and the post dialogue action; and the hardware device operatively coupled to the processing unit, the hardware device to receive an instruction related to the analyzed dialogue data, wherein receipt of the instruction causes a physical action comprising the hardware device to change states, actuation of a second hardware device, or combinations thereof.

7. The computer program product of claim 6, further comprising program code to detect non-verbal data and apply the detected non-verbal data to the identified term and post dialogue action.

8. The computer program product of claim 7, further comprising program code to evaluate proximity of occurrence of the identified term to the detected non-verbal data.

9. The computer program product of claim 7, further comprising program code to detect a response to the post dialogue action, and to classify the detected response with the new entry in the dialogue tree.

10. The computer program product of claim 6, wherein the dynamic modification of the dialogue tree is a confirmation of an association between the identified term and the post dialogue action.

11. A method for processing natural language (NL), comprising:

detecting dialogue data and analyzing the detected dialogue data, including identification of a term within the detected dialogue data;

monitoring a post dialogue action, including physical actuation of a hardware device and proximity of the actuation to the detected dialogue data;

constructing a hypothesis from an identified key phrase drawn from the analyzed dialogue and the monitored post dialogue action;

evaluating a re-occurrence of the identified term in a first dialogue and a second dialogue, and applying a weight to the identified term, wherein the weight reflects prominence of the identified term;

dynamically modifying a dialogue tree responsive to the applied weight, including addition of a new entry into the dialogue tree, the new entry including the identified term and the post dialogue action; and a hardware device operatively coupled to the processing unit, the hardware device to receiving an instruction related to the analyzed dialogue data, wherein receipt of the instruction causing a physical action comprising the hardware device to change states, actuation of a second hardware device, or combinations thereof.

12. The method of claim 11, further comprising detecting non-verbal data and applying the detected non-verbal data to the identified term and post dialogue action.

13. The method of claim 12, further comprising evaluating proximity of occurrence of the identified term to the detected non-verbal data.

14. The method of claim 12, further comprising detecting a response to the post dialogue action, and classifying the detected response with the new entry in the dialogue tree.

15. The method of claim 11, wherein the dynamic modification of the dialogue tree is a confirmation of an association between the identified term and the post dialogue action.

* * * * *